United States Patent [19]

Carroll

[11] Patent Number: 4,778,246

[45] Date of Patent: Oct. 18, 1988

[54] HIGH TENSILE STRENGTH COMPACTED TOWING CABLE WITH SIGNAL TRANSMISSION ELEMENT AND METHOD OF MAKING THE SAME

[75] Inventor: David W. Carroll, Doylestown, Pa.

[73] Assignee: Acco Babcock Industries, Inc., Fairfield, Conn.

[21] Appl. No.: 734,736

[22] Filed: May 15, 1985

[51] Int. Cl.⁴ .................................................. G02B 6/44
[52] U.S. Cl. .................................. 350/96.23; 174/115; 174/129 R; 174/129 S; 57/3.5; 57/215
[58] Field of Search ..................... 350/96.23; 174/115, 174/128 R, 129 R, 129 S, 130, 131 R, 131 A; 57/215, 3.5, 9

[56] References Cited

U.S. PATENT DOCUMENTS

| | | | |
|---|---|---|---|
| 514,925 | 2/1894 | Guilleaume | 174/115 |
| 883,759 | 4/1908 | Tångring | 174/128 R |
| 3,131,469 | 5/1964 | Glaze | 174/128 R |
| 3,234,722 | 2/1965 | Gilmore | 57/215 |
| 4,342,500 | 8/1982 | Oestreich et al. | 350/96.23 |
| 4,401,361 | 8/1983 | Slaughter | 350/96.23 |
| 4,538,023 | 8/1985 | Brisson | 174/115 |

FOREIGN PATENT DOCUMENTS

| | | | |
|---|---|---|---|
| 0937392 | 8/1948 | France | 174/131 |
| 0150905 | 9/1983 | Japan | 350/96.23 |
| 1422147 | 1/1976 | United Kingdom | 350/96.23 |

*Primary Examiner*—John Lee
*Attorney, Agent, or Firm*—Pennie & Edmonds

[57] ABSTRACT

A high tensile strength transmission cable having a plurality of main compacted strands. The strands surround, and are adjacent to, an uncompacted and moveable core which may form or contain one or more transmission elements. A method for making such a high strength transmission cable includes the steps of compacting the cable formed by a plurality of pre-compacted strands wound around a hard core wire, opening the strands to replace the hard core wire with a soft core containing transmission elements, and then closing the strands.

11 Claims, 2 Drawing Sheets

FIG. 1
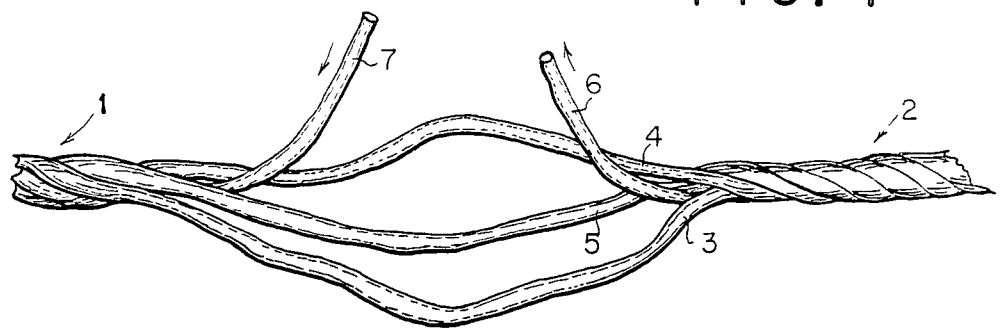
FIG. 2
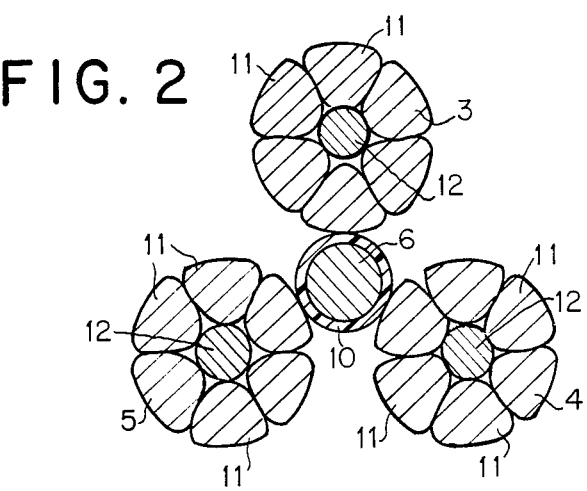
FIG. 3
FIG. 4
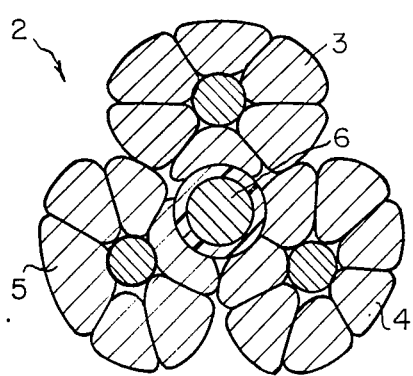

HIGH TENSILE STRENGTH COMPACTED TOWING CABLE WITH SIGNAL TRANSMISSION ELEMENT AND METHOD OF MAKING THE SAME

FIELD OF THE INVENTION

This invention relates to a high tensile strength transmission cable and a method of making the same. More specifically the invention concerns a transmission cable made from a pre-compacted cable having a plurality of compacted strands surrounding a hard core where the hard core is replaced with a soft uncompacted core which may contain one or more transmission elements.

BACKGROUND OF THE INVENTION

Towed targets, either aerial or underwater, require tow cables which can withstand high tensile loads resulting from the drag of the target being pulled through an air or water medium. Cables as currently used are 1×19 strand compacted armored cables having eighteen strand wires surrounding a center core wire, compacted 1×7 strand cables comprising six strand wires surrounding a center core wire and strand wire double-compacted 3×7 cables comprising three strands surrounding a center core wire where each strand itself comprises six strand wires surrounding a center core strand wire. In order to reduce the diameter or cross-sectional bulk of such cables and thus drag forces imparted as the cables move through air or water, they are compacted by swaging tools. In the case of the 1×19 and 1×7 cables, they are subjected to one compacting operation whereas in the double-compacted 3×7 cable, each 1×7 strand is subjected to one compacting operation and the three 1×7 strands are then subjected to a further or second compacting operation.

While such cables provide sufficient tensile strength, have a high strength- to-diameter ratio, and are torsionally stable, they lack any transmission capabilities by which electrical power, electrical signals or signals may be transmitted between the towed target and the towing vehicle. With the more sophisticated targets being currently used, it is often desirable to connect the target to power sources to actuate infra-red transmitters on the target or to provide the target with hit indicators which may transmit hit signals to the towing vehicle.

Coaxial cables have been proposed to provide both tensile strength and transmitting qualities. Such cables comprise concentric layers of electrical conductors or strength elements separated by layers of insulation with the result that the cables have poor torsionial stability which limits their utility.

It has also been proposed to combine tensile strength elements along with electrical conductors having shielding or to use fiber optic and hollow conductive elements arranged within a protective matrix to provide a cable having both high tensile strength and transmitting characteristics. However transmitting elements, particularly hollow conduits or fiber optics, are not susceptible to compacting operations without risk of damage with the result that such cables have a low maximum strength-to-diameter ratio such that their drag characteristics are objectionable.

It is therefore an object of my invention to provide for a high tensile strength transmission cable which has a transmission element therein and which at the same time has high strength-to-diameter ratio to reduce drag as the cable is pulled through a fluid medium.

It is a further object of my invention to provide for a method by which a high tensile strength transmission cable may be made from a pre-compacted multi-strand cable and where the high strength transmission cable will have transmission elements therein which are not subjected to compaction forces.

BRIEF DESCRIPTION OF THE DRAWINGS

Referring to the drawings, FIG. 1 is a diagrammatical view of a high tensile strength transmission cable in the process of being constructed according to the invention illustrating removing of a hard center core wire from an open pre-compacted multi-strand cable and then inserting a relatively soft core into the open cable;

FIG. 2 is a cross-sectional view of a multi-strand cable in which the individual strands have been compacted prior to the strands being compacted together about a hard center core wire;

FIG. 3 is a view similar to FIG. 2 after the strands of the cable have been completely compacted together about a center core wire so that adjacent strands contact each other;

FIG. 4 is a view similar to FIG. 3 after the strands of the cable have been partially compacted together about a hard core wire to leave a space between adjacent strands;

DESCRIPTION OF THE PREFERRED EMBODIMENTS

Figure 5:
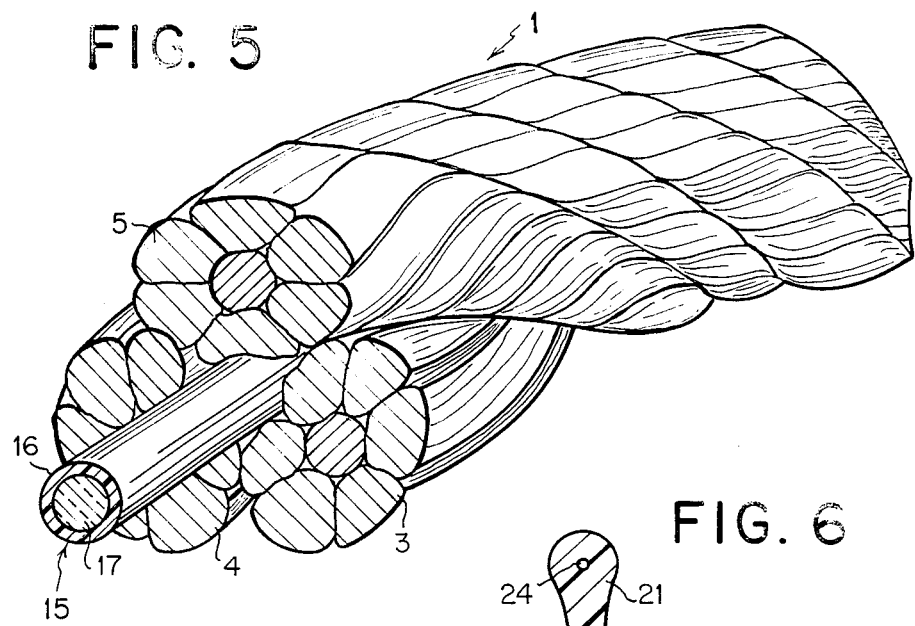
FIG. 5 is a perspective view of a cable constructed according to the invention having a fiber optic or electrical transmission element therein.

Referring to FIG. 1 there is illustrated a high tensile strength transmission cable 1 constructed according to the invention which is formed from a conventional precompacted cable 2. Cable 2, shown in FIG. 2, has three main strands 3, 4 and 5 which surround a hard core wire 6 coated by coating 10 which as shown in the drawing, is removed from a laid open portion of the cable 2.

As shown on the left side of FIG. 1, the hard core wire 6 is replaced by a core 7 of a softer material which is inserted between the open strands 3, 4 and 5 after which the strands are closed to form the cable 1.

Each of the main strands 3, 4 and 5 in turn comprise six secondary strand wires 11 in turn surrounding a hard center core strand wire 12. Main strands 3, 4 and 5 are, as shown in FIG. 2, pre-compacted by, for example, a swaging tool to reduce their diameters and which results in the deformation and compaction of the secondary strands 11.

Referring to FIG. 3 it is seen that main strands 3, 4 and 5 are further compacted around the hard core wire 6 by a second compacting operation such that the cable 2 achieves a cross-sectional configuration having an overall maximum strength-to-diamater ratio. In this particular configuration, the strands are compacted to such an extent that adjacent strands bridge and contact each other.

Referring to FIG. 5, the complete cable 1 is illustrated and after the hard core wire 6 has been removed from cable 2 and replaced by a relatively soft core 15 which, as shown, is of circular configuration of substantially the same diameter as the hard core wire it replaces. The core 15 may comprise either a fiber optic material or a relatively soft wire where both serve as a transmission element, or the core could easily comprise a tubular member having further transmission elements therein. The transmission element or elements are preferably coated with a lubricant 16 so that the strands may slide relatively with respect to the core during flexure of the cable 1.

It is obvious by comparing FIG. 5 with FIG. 3 that the cable 1 has substantially the same diameter as that shown for cable 2 in FIG. 3 so that it has the same high tensile strength-to diameter-ratio characteristics even though the core 15 comprising the transmission element could not be subjected to a compacting force without damage. Thus it is seen in FIG. 5 that the cable 1 has high tensile strength properties which are imparted by the main strands 3, 4 and 5 while also having a transmission element 17 by which signals may be transmitted along the length of the cable, as for example, between a towing target and a towing vehicle.

Figure 6:
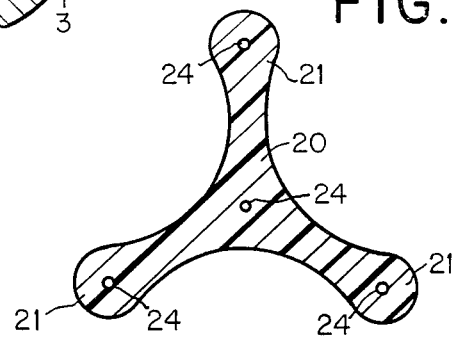
FIG. 6 is a cross-sectional view of a center core constructed according to a further embodiment of the invention comprising an insulation material and having transmission elements therein; and, FIG. 7 is a cross-sectional view of a cable construction according to the invention utilizing the core of FIG. 6.
Figure 7:
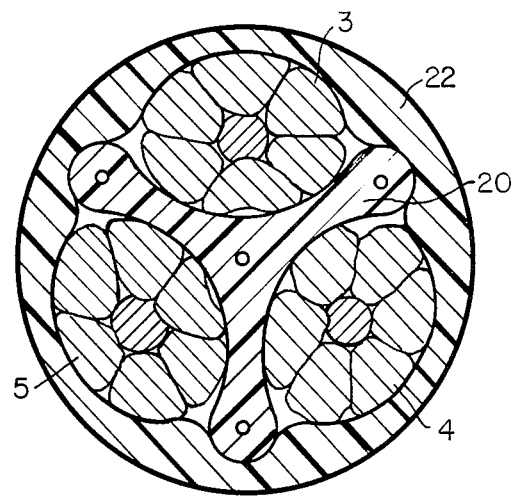

Referring to FIG. 4, there is illustrated a cross-sectional view of the cable 2 where the main strands 3, 4 and 5 are not compacted to the same extent as that shown in FIG. 3 such that a space remains between adjacent strands. This space is necessary to accommodate a core 20 as shown in FIGS. 6 and 7 where the core comprises an electrically non-conductive material, for example, a non-conductive plastic material and which is in the form of a ribbon extending along the length of a cable. The core 20 includes therein ribs or arms 21 which, as shown in FIG. 7, extend between adjacent main strands 3, 4 and 5 so as to insulate adjacent strands from one another. The resulting cable construction has a plastic sheath 22 surrounding the main strands 3, 4 and 5 so that the strands are encased within the sheath and so that the main strands are insulated from one another. In this form of the invention, the main strands themselves may comprise electrically conductive elements whereby the strands act as power leads extending between a towed target and a towed vehicle. The core 20 may in addition include one or more transmission elements 24 in the form of electrical conductive elements or fiber optics through which signals are transmitted.

While I have disclosed a cable comprising three main strands surrounding a softer core and wherein each main strand comprises a plurality of secondary strands surrounding a hard core, the invention contemplates other numerical combinations of main strands alone or combined with secondary strands. For example and with reference to FIG. 1, the main strands 3, 4 and 5 as shown could each comprise a single wire wherein the resulting construction would be a 1×4 cable construction with three strands surrounding a core. Other numerical combinations would be applicable and the core element 20 could be changed accordingly namely, to insure that there would be a rib extending between each adjacent main strand.

The method of manufacture of a cable according to the invention is generally as follows. The cable 2 as shown in FIG. 1 having a multiplicity of main strands which have been pre-compacted and which surround a hard core wire are further compacted about the hard core wire 6 to an extent where the main strands contact each other, or if a plastic core of the type shown in FIGS. 6 and 7 is to be used, to an extent where a space is left between adjacent main strands. The main strands are opened after which, as shown in FIG. 1, the hard core wire 6 is removed. Immediately after removal of the hard core wire, a softer core 7 is inserted between the open main strands 3, 4 and 5 after which the main strands are closed to form the cable 1.

Where it is contemplated that the main strands themselves will act as transmission elements, the core 7 would be substituted by the plastic ribbon core 20 and the process would include the additional step of thereafter encasing the main strands within the plastic sheath 22.

I claim:

1. A composite high tensile strength towing cable including:
    an outer cable structure formed of a plurality of unitary strands, said strands being compacted into one another such that the cross-sectional shape of said strands is deformed from an initial circular shape to a final non-circular shape; and
    a central fragile non-deformed optical fiber signal transmission element.

2. A method of manufacturing a high tensile strength transmission cable from a pre-compacted multi-strand cable having a plurality of main strands surrounding a hard core wire including the sequential steps of opening the main strands, removing the hard core wire from the cable, inserting a relatively soft core containing a transmission element, and closing the main strands.

3. A method of manufacturing according to claim 2 including the additional step of encasing the cable in an electrical insulation sheath after closing the main strands.

4. A method of manufacturing a high tensile strength transmission cable from a multi-strand cable having a plurality of main strands surrounding a hard core wire, including the sequential steps of compacting said main strands around said hard core wire, opening the main strands, removing the hard core wire from the cable, inserting a relatively soft core, and closing the main strands.

5. A method of manufacturing according to claim 4 wherein the step of compacting the main strands includes compacting the strands until adjacent strands are bridged to contact each other and wherein the step of inserting a relatively soft core includes inserting a circular core element in the form of an electrical conductor or an optical fiber.

6. A method of manufacturing according to claim 4 wherein the step of compacting the main strands includes compacting the strands sufficiently to leave a space between adjacent strands and the step of inserting a relatively soft core includes inserting an insulation element having ribs which extend into the spaces between adjacent strands.

7. A cable made by the process of claim 2.
8. A cable made by the process of claim 3.
9. A cable made by the process of claim 4.
10. A cable made by the process of claim 5.
11. A cable made by the process of claim 6.

* * * * *